Jan. 25, 1955
M. C. DEPP ET AL
2,700,745
DATA TRANSMISSION SYSTEM AND CORRECTOR THEREFOR
Filed March 21, 1951
3 Sheets-Sheet 1
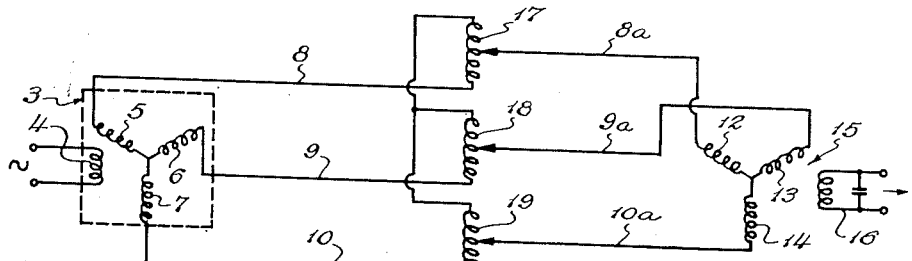
*Fig.1.*
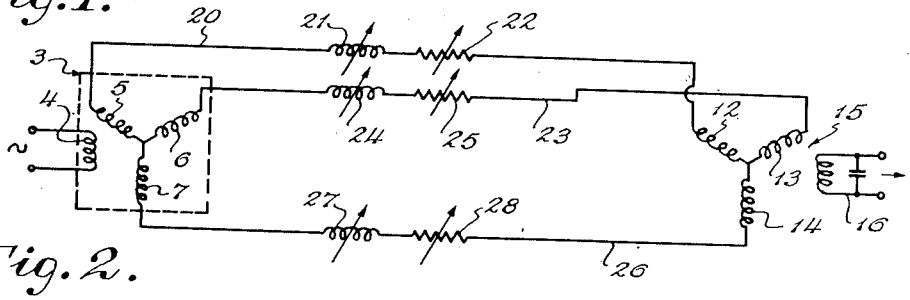
*Fig.2.*
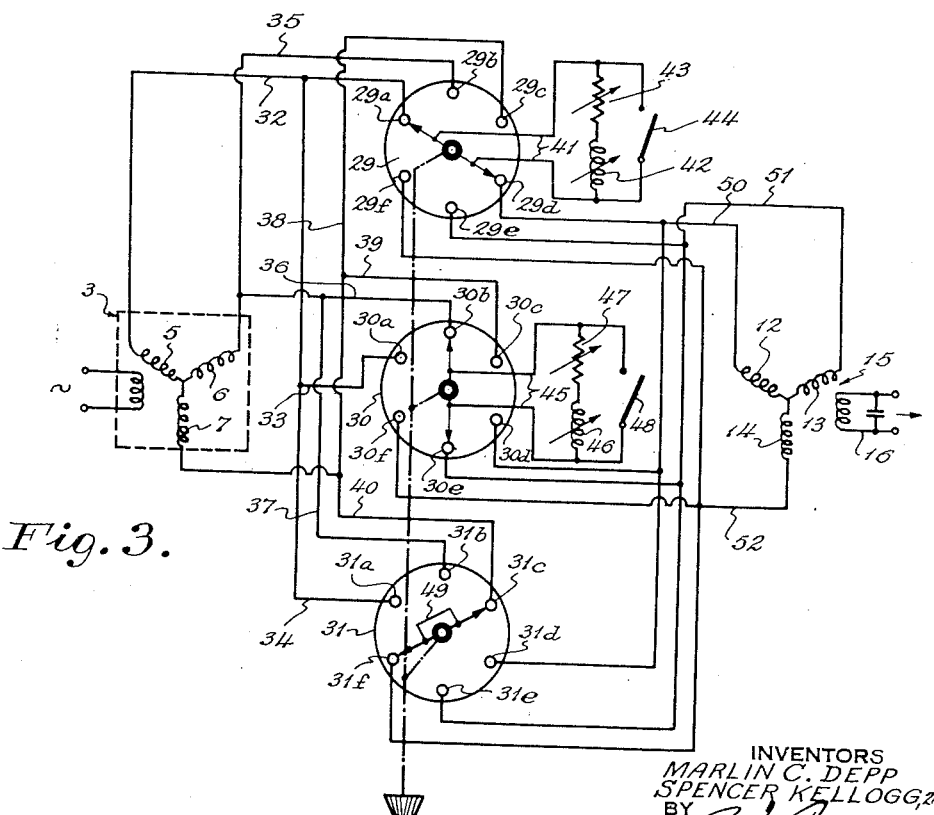
*Fig.3.*
INVENTORS
MARLIN C. DEPP
SPENCER KELLOGG, 2ND
BY
ATTORNEY Jan. 25, 1955    M. C. DEPP ET AL    2,700,745
DATA TRANSMISSION SYSTEM AND CORRECTOR THEREFOR
Filed March 21, 1951    3 Sheets-Sheet 3
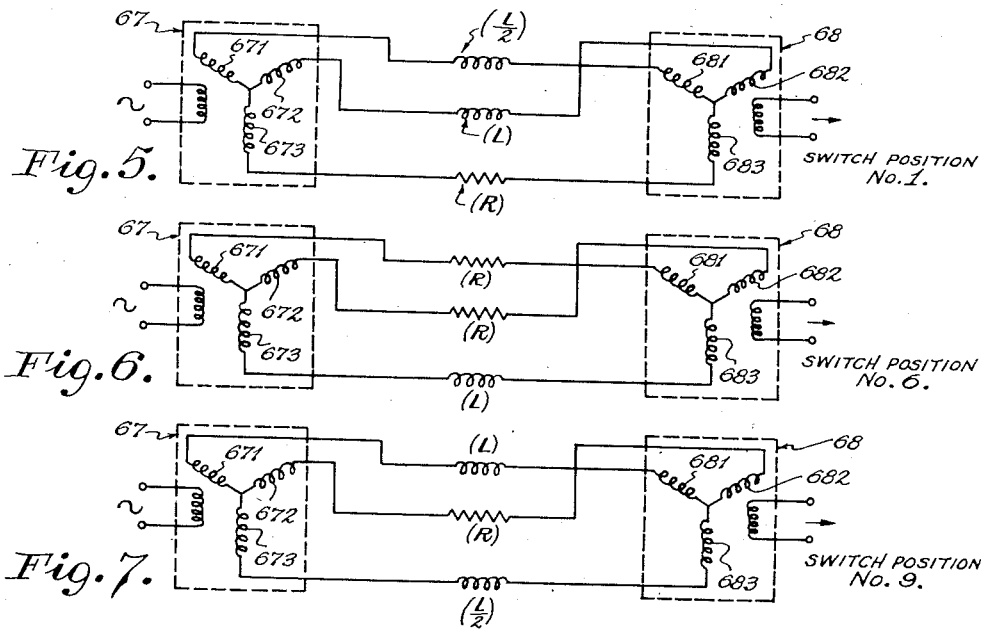
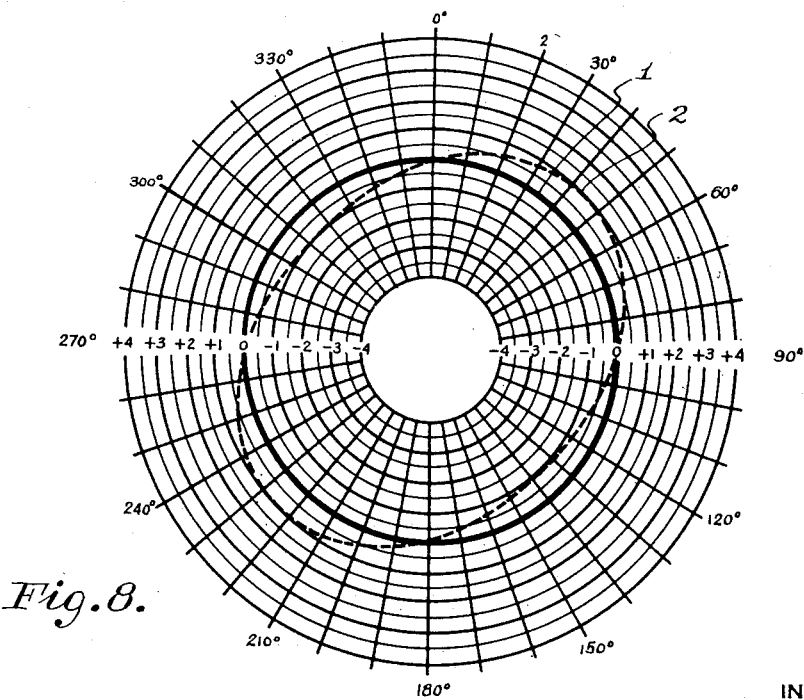
Fig.8.
INVENTORS
MARLIN C. DEPP
SPENCER KELLOGG, 2ND
BY
ATTORNEY

United States Patent Office 2,700,745
Patented Jan. 25, 1955

2,700,745

DATA TRANSMISSION SYSTEM AND CORRECTOR THEREFOR

Marlin C. Depp, Hempstead, and Spencer Kellogg II, Glen Head, N. Y., assignors to The Sperry Corporation, Great Neck, N. Y., a corporation of Delaware Application March 21, 1951, Serial No. 216,788

7 Claims. (Cl. 318—24)

The present invention relates to a data transmission system having a corrector embodied therein for correcting or compensating for errors appearing in the transmission system; and, more specifically, the present invention relates to such a system having means therein for correcting or compensating for a type of error herein termed a double-cycle error.

Data transmission systems, as herein contemplated, include systems of the selsyn type such as, for example, those in which a transmitter feeds into the stator of a signal transformer, the rotor of which comprises a single phase winding which will provide a voltage output proportional to the angular disagreement between the rotor winding and the direction of the resultant field of the stator of the transformer. Also, included within the data transmission systems to which the present invention relates are flux valve systems wherein the receiver may constitute a motor of the selsyn type or a signal transformer while the transmitter is a flux valve or similar data transmitter in which the stator comprises a plurality of pickup or signal windings connected together in multi-circuit fashion and to the corresponding similarly connected stator windings of the receiver.

In the present specification, the problems giving rise to errors of the character corrected or compensated for by the present invention and the invention itself will be discussed in terms of a flux valve system and it will be understood therefore that the present specification refers to a flux valve system primarily by way of explanation and also for the purpose of disclosing a preferred embodiment.

In flux valve systems, the positional data, using the horizontal component of the earth's field as a directional reference, which is developed by the flux valve is supplied to a remote indicator which may be a selsyn-like motor or signal transformer, the flux valve and stator of the receiver being electrically connected together in multi-circuit fashion. Obviously, the remote indicator, whether it be driven directly by the selsyn motor or through a servo loop in accordance with the signal voltage developed in the signal transformer, should provide extremely good definition throughout 360° of rotation of the flux valve in the earth's field. However, various types of errors exist which ordinarily are attributable to known factors. That type of error which the present invention serves to correct or compensate is termed a double-cycle error in that the disagreement or error between the indicator and magnetic north, for example, or other reference, varies equally and symmetrically through two positive and two negative values as the flux valve is rotated throughout 360°. This error is attributable in the main to the following three factors.

First, a voltage unbalance may exist among the flux valve legs. That is to say, the maximum voltage which will be developed in any one leg of the flux valve is not equal to the maximum voltage developed in any other leg, or, to put it another way, the voltages developed in the various flux valve legs, when occupying the same angular relationship with respect to the external field, are unequal. The maximum voltage developed in all of the flux valve legs should be equal. Secondly, any ellipticity of the stator of the signal transformer will produce a double-cycle error in the system, and thirdly, any inequality in the stator coils of the signal transformer will likewise produce a double-cycle error.

Therefore, it can be seen that the double-cycle error is primarily due to asymmetry in the system or unbalance between the various legs of the system, and this effect may be defined as an impedance unbalance in the system. Since such systems primarly involve resistance and inductive reactance, the unbalance in the system will be considered as one of a resistive and inductive reactance nature.

The present invention relates to a means for correcting or compensating for double-cycle errors in data transmission systems of the above character, and the primary object of the present invention resides in providing a data transmission system which includes a variable impedance means connected in circuit with the various legs of the transmission system.

More particularly, it is an object of the present invention to provide a data transmission system embodying a corrector comprising impedance means having a reactance component, preferably a variable reactance, so connected in the system that it may be adjusted for the proper values to rebalance the system.

Another object resides in providing a data transmission system and corrector therefor in which desired values of reactance are selected from variable inductance means to correct for the magnitude of the error while means are provided for inserting the various selected values of inductance in the various legs of the transmission system to correct for the direction of such error.

Other objects reside in providing a corrected data transmission system in which variable inductances are connected across the respective legs of the transmission system; in which inductances are connected in series in the legs of the transmission system; in which inductance and resistance is connected in various legs of the system; and in which variable inductance and variable resistance is connected in series in the various legs of the transmission system.

It is still another object to provide a corrector or compensator for a data transmission system which is characterized by the fact it may be located remotely from either the transmitter or receiver to thereby facilitate adjustments in the system.

With the foregoing and still other objects in view, our invention includes the novel elements and the combinations and arrangements thereof described below and illustrated in the accompanying drawings, in which:

Fig. 1 is a wiring diagram schematically showing one form of the present invention;

Fig. 2 is a wiring diagram schematically showing a preferred form of the invention;

Fig. 3 is a wiring diagram of a system similar to that of Fig. 2 but modified to the extent that selected values of inductance and resistance may be connected in any of the circuit legs;

Figure 4:
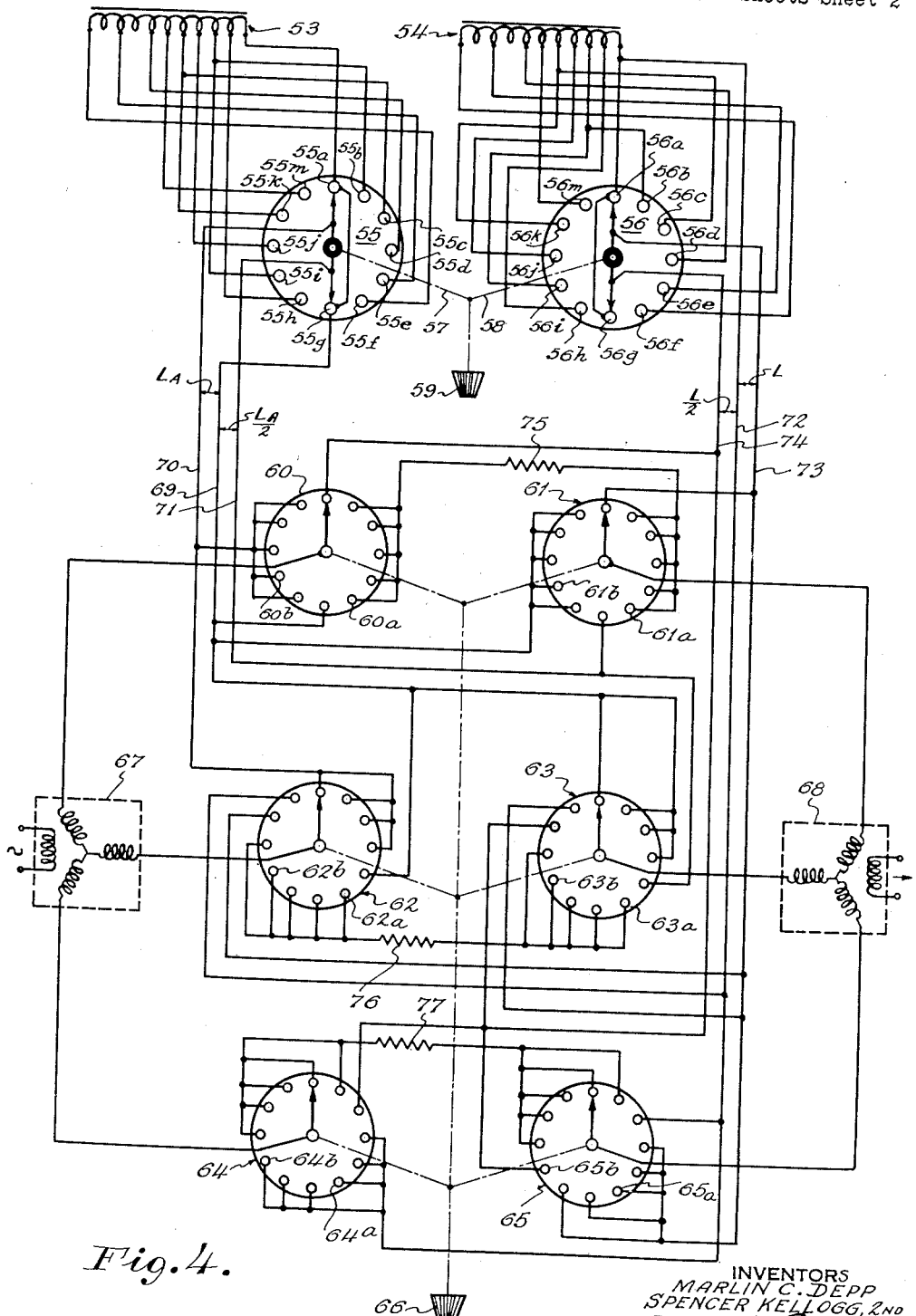
Fig. 4 is a wiring diagram of a preferred form of the invention wherein values of inductance may be chosen to provide the desired magnitude of correction while these inductance values together with values of resistance may be varied in the various legs of the transmission circuit to rotate the correction by predetermined increments throughout substantially 180°.

Figs. 5, 6 and 7, diagrammatically illustrate the electrical nature of the correction in the various legs of the transmission system for various positions of the switches shown in Fig. 4; and Fig. 8 is a polar diagram illustrating the double-cycle error effect in a flux valve compass system.

Before proceeding with a description of the preferred embodiments of the present invention, it may be more illustrative first to point out the effect of a double-cycle error in a data transmission system such for example as a flux valve compass system. Referring first to Fig. 8 wherein we have shown a polar plot of the compass error, the solid circle 1 indicates the desired definition provided by the compass system, that is, zero error between the directional indication provided by the direction indicator for all positions of the craft or flux valve when rotated throughout 360°. However, a double-cycle error will cause the definition curve to approximate an ellipse in form as represented by the dash line curve 2. Reading radially on the polar plot, it will be seen that the double-cycle error has a positive and negative maximum value of 1° and that its direction is approximately 45°. As hereinbefore indicated, the present invention contemplates providing a correcting or compensating apparatus in which both the magnitude and the direction of the error may be adjusted to reduce it substantially to zero and thereby cause the definition curve of the system to approximate the circular one shown in Fig. 8.

It may be mathematically demonstrated that whether the double cycle error in a flux valve or selsyn system is due to voltage unbalance in the output of the flux valve or selsyn transmitter or due to impedance unbalance in the circuits associated therewith, correction for such error may be accomplished by treating the error as due to impedance unbalance. Hence, the use of a variable series-connected impedance in the circuit will serve to correct for such error. For example, the flux valve may be considered to comprise three separate signal voltage generators having output that are each a function of time, the angle of the core of the flux valve leg with respect to the earth's field or other unidirectional field to which it is subjected and the circuit impedance. The resulting currents which produce fluxes in the air gap of the synchro receiver are a function of time, circuit impedance, flux valve voltage output and the angle which the core of the flux valve leg, in each case, makes with respect to the earth's field vector. If the time phase of one of the flux valve legs is used as a reference and we assume that the circuit impedances are so balanced that all currents are in time phase, we can eliminate a consideration of the time function in determining the direction of the resultant flux in the synchro receiver. Furthermore, we may assume that the magnitudes of the impedances are equal. This will serve further to simplify the equations and under these assumptions it can be mathematically shown that the angular position of the vector resultant of the flux in the air gap of the synchro receiver as a function of the position of the flux valve in the earth's field or the position of the rotor of a selsyn transmitter in its stator field will be (1)
$$\theta_r = \tan^{-1} \frac{\frac{\sqrt{3}}{2}[e_{m3} \cos(\theta_1 + 240°) - e_{m2} \cos(\theta_1 + 120°)]}{e_{m1} \cos \theta_1 - \frac{1}{2}[e_{m2} \cos(\theta_1 + 120°) + e_{m3} \cos(\theta_1 + 240°)]}$$

in which $\theta_r$=the angular position of the vector resultant of the flux in the air gap of the synchro receiver as a function of the position of the flux valve in the earth's field; $e_{m1}$=the maximum voltage output of the first leg of the flux valve; $\theta_1$=the angle which the first leg of the flux valve makes with the earth's field vector; $e_{m2}$=the maximum voltage output of the second leg of the flux valve; $e_{m3}$=the maximum voltage output of the third leg of the flux valve. If the maximum voltage outputs of the three flux valve legs are equal to each other then Equation 1 will reduce to (2)    $\tan \theta_1 = \tan(\theta_r)$ and perfect definition will result. However, in the general case, the three legs of the system are not exactly balanced and definition errors such as the double cycle error result, and this may be expressed as (3)    $\tan \theta_1 \neq \tan(\theta_r)$; and $[\theta_1 - \theta_r]$=error angle If Equation 1 is written for each of the three legs of the flux valve to represent the error or amount of unbalance between it and the other legs, these equations will demonstrate that the shape of the definition curve will remain the same for a given unbalance producing two cycle error and that, with a given error in the system, the curve will rotate as the unbalance, voltage or impedance, is transferred from one flux valve leg to the other. It may also be mathematically demonstrated that for a condition of impedance unbalance in the system, the equation for $\theta_r$ will be of the same form as Equation 1 set forth above. Hence, double frequency error may arise due to either unbalanced maximum voltage outputs from the transmitter or impedance unbalance between the various legs of the transmission system.

In accordance with the present invention, the unbalance between the various legs of the data transmission system is corrected by any effect creating a balance therein through the use of impedances and the direction in which the correction may be made may also be effected by so correlating the various impedance values interposed in the legs of the transmission circuit as to thereby cause a definition curve showing a two-cycle error of the character designated at 2 in Fig. 8 to approach and approximate the full line definition curve of circular form therein.

In accordance with one embodiment of our invention, as illustrated in Fig. 1, we propose to insert variable auto transformers, inductances such as "Variacs" and the like in various legs of the data transmission system. For example, referring to Fig. 1, 3 indicates generally a data transmitter which for illustrative purposes, we may designate as a flux valve. The flux valve comprises the usual exciting winding 4 and Y-connected signal pickup or stator windings 5, 6 and 7, respectively. The signal windings are connected together in Y fashion and to transmission lines 8, 9 and 10. Ordinarily, these transmission lines are connected directly to the similarly connected stator windings 12, 13 and 14 of a selsyn-like receiver indicated generally at 15. The receiver may be a signal transformer or motor, and, in the illustration herein employed, it is represented as a signal transformer comprising the rotor winding 16 across which an error output voltage is adapted to be developed depending upon the relation of the rotor winding with respect to the direction of the resultant flux produced by the stator windings. A tuning condenser may be connected across the rotor winding as illustrated. However, in accordance with our invention, the leads 8, 9 and 10 are connected, respectively, to one terminal of three auto transformers 17, 18 and 19, the other terminals thereof being connected together to produce a Y-connection. The adjustable output terminals or taps of the transformers are connected, respectively, through leads 8a, 9a, and 10a to the stator windings of the receiver 15. In this manner, it will be seen that unbalance between the various legs of the transmission system may be corrected by adjustment of the various auto transformers. As a practical matter, only two of the transformers need comprise an adjustable tap since the third may serve merely as a balancing load. Either taps and a contactor therefor or sliders may be employed. For small errors, taps and contactors may be used provided it is only necessary to make the required correction to the order of the nearest 0.1°.

In Fig. 2 we have shown another modification of our invention wherein the flux valve 3 and selsyn like receiver 15 are connected together with adjustable impedances connected in series in the various legs of the transmission system. As illustrated, leg 5 of the flux valve is connected to winding 12 of the receiver by means of lead 20 which has the variable inductance 21 and variable resistance 22 connected in series therein. Similarly, lead 23 has the variable inductance 24 and variable resistance 25 connected in series therewith, and lead 26 has the variable inductance 27 and variable resistance 28 connected in series therewith.

Since the data transmission system shown in Fig. 2, and also those shown in the other figures, is primarily of an inductive nature, compensation or correction for two cycle error is effected by using variable inductances in the various legs of the system. However, it will be understood that if the circuit comprised capacitive reactance to any appreciable extent, a correction device including capacitive reactance would preferably be employed.

If the two cycle error in a given data transmission system is relatively small, the values of inductance required for edequate compensation or correction may, for example, be of a value variable from zero to 0.002 henry. With values of inductance of this order, no additional series resistance need necessarily be employed if the direct current resistance of the inductance is, for example, under about 2 ohms. However, the insertion of resistive components is preferable where it is desired to make the maximum signal voltage to minimum signal voltage as large as possible.

In Fig. 3, we have shown a system including a two cycle error correction device which is generally of the character of that shown in Fig. 2. However, switches are provided in the circuit of Fig. 3 so that preselected values of inductance and resistance may be shifted from one circuit leg to another so as to vary the direction of the correction while the magnitude of the correction will remain constant at the values selected by operation of the variable inductances and resistances, respectively. It will also be noted that in Fig. 3 the selected values of impedance are inserted in only two legs of the system and that correction in all three legs thereof is not essential as above pointed out in connection with the embodiment of our invention shown in Fig. 1.

In Fig. 3, the flux value or selsyn transmitter is again indicated at 3 and the receiver is indicated at 15. Each of the leads from the pick-up windings 5, 6 and 7 of the flux valve is connected to one of the contacts of three rotary switches indicated generally at 29, 30 and 31. Pick-up winding 5 is connected through lead 32 to contact 29a of switch 29, through lead 33 to contact 30a of switch 30 and through lead 34 to contact 31a of switch 31. Similarly, winding 6 of the flux valve is connected through lead 35 to contact 29b of switch 29, through lead 36 to contact 30b of switch 30 and through lead 37 to contact 31b of switch 31. In like manner, winding 7 of the flux valve is connected through lead 38 to contact 29c of switch 29 through lead 39 to contact 30c of switch 30 and through lead 40 to contact 31c of switch 31. Each of the switches are of the rotary type and comprise a pair of rotary contacts disposed in 180° angularly spaced relation and insulated from each other. These rotary contacts are adapted to engage the fixed contacts of the switches and those of switch 29 have connected therebetween by means of leads 41 a series-connected variable inductance 42 and variable resistance 43. Also, if desired, a switch 44 may be connected in shunt thereacross. Similarly, the rotary contacts of switch 30 have a series connected variable inductance 46 and variable resistance 47 connected therebetween by means of leads 45. Switch 48 may be connected in shunt thereacross as shown. In the embodiment illustrated, the rotary contacts of switch 31 are connected together by lead 49 so as to provide a direct connection therebetween. The contact 29d of switch 29 which lies diagonally opposite contact 29a and the similarly positioned contacts 30d and 31d of switches 30 and 31 are connected together and through lead 50 to the stator winding 12 of receiver 15. Likewise, the contacts 29e, 30e and 31e of the respective switches are connected together and through lead 51 to the stator winding 13 of the receiver, and contacts 29f, 30f and 31f are connected together and through lead 52 to the stator winding 14 of the receiver. The rotors of these switches are ganged together as indicated by the dot-dash line so that they will be simultaneously actuated from one position to another.

In the position of the switches shown in Fig. 3, the preselected values of inductance and resistance provided by a setting of the inductance 42 and resistance 43 are connected in series between the winding 5 of the flux valve and the winding 12 of the receivers. At this time, switch 30 serves to connect the pre-selected values of inductance and resistance provided by the inductance 46 and resistance 47 in series between the winding 6 of the flux valve and the winding 13 of the receiver. For exemplary purposes, switch 31 is shown as effecting a direct connection between the various corresponding legs or windings of the flux valve and receiver. In other words, in the position of the switch 31 shown in Fig. 3, winding 7 of the flux valve is connected directly with winding 14 of the receiver. When, however, the switches are actuated in a clockwise direction to engage the next adjacent contacts, the preselected values of reactance and resistance previously connected between the windings 5 and 12 of the flux valve and receiver are connected between the windings 6 and 13 thereof, and the preselected values of reactance and resistance previously connected between the windings 6 and 13 of the flux valve and receiver will be connected between the winding 7 of the flux valve and the winding 14 of the receiver. In this position of the switches, the switch 31 will effect a direct connection between the windings 5 and 12 of the flux valve and receiver. Thus, the magnitude of the correction for two cycle error may be effected by adjusting the values of inductance and resistance provided respectively by the inductance 42, resistance 43 and the inductance 46, resistance 47, and the direction of such compensation or correction can be regulated by means of the switches 29, 30 and 31.

In Fig. 4, we have shown a modification of our invention which functions in a manner quite similar to the embodiment thereof shown in Fig. 3. In this embodiment, one pair of ganged rotary switches is provided to select desired values of inductance to thereby control the magnitude of the correction, and a plurality of ganged switches, shown as six in number, are provided to vary the direction of the correction in increments of 15° throughout 180°.

More specifically, and referring to Fig. 4, two tapped inductances or coils are provided which are indicated at 53 and 54. For exemplary purposes, each of these coils is provided with ten taps having equal values of inductance therebetween, and the total inductance of each may be, for example, of the order of 0.002 henry. A number of the taps of the coil 53 are connected as shown to the contacts 55a, 55b, etc. to 55m inclusive of switch 55, there being twelve contacts shown although more or less contacts may be employed. Similarly, coil 54 is provided with ten taps having equal values of inductance therebetween and having a total inductance which may be of the same value as that of inductance 53. In a manner similar to that described in connection with coil 53, a plurality of the taps on coil 54 are connected respectively to contacts 56a, 56b etc. to and including contact 56m of switch 56. The switches 55 and 56 are of the rotary type, each comprising a pair of rotary switch contacts, which are relatively angularly disposed at 180° to engage diagonally opposite contacts of the switch and are electrically insulated from each other. It will be noted that the contacts 55a and 55g of switch 55 are connected together and to one end of the coil 53, while the remaining contacts of switch 55 are connected with different values of inductance. The same is true of the contacts of switch 56. It will also be noted that these switches are ganged together as indicated by the dot-dash lines 57 and 58 for operation by a control knob 59.

For the values of inductance hereinabove indicated as provided by the coils 53 and 54, which values are mainly for exemplary purposes, the magnitude of the correction which is provided by the inductances may be varied in increments of 0.2°, that is, degrees of error or error magnitude, for successive positions of the rotary contacts between contact 55a or 56a and contact 55f or 56f. Through this range of operation, the magnitude of the maximum error correction is varied from 0° of correction with the rotary contacts in engagement with contact 55a or 56a up to an error correction of 1°, which will be effected when the rotary switch arms engage contact 55f or 56f.

The six ganged switches shown in Fig. 4 serve to switch the selected or correct values of inductance into one or more of the three legs connecting the transmitter and the receiver. These switches may connect pre-selected values of inductance or resistance in various combinations and in various circuit legs to effect a control over the direction in which the error correction is effected. As hereinabove pointed out, the direction of correction will be varied in increments of 15° throughout 180° in the circuit of Fig. 4. For example, if the direction of the error occurs in the direction indicated by the dash line curve 2 of Fig. 8, that is, at an angle of approximately 45°, the switches in Fig. 4 will be rotated to effect the desired magnitude of correction at the same angle or along the 45° axis. In this manner, the resultant definition curve will approximate a circle.

The direction controlling switches are represented in Fig. 4 at 60, 61, 62, 63, 64 and 65. The single rotary contact of each switch is ganged together as represented by the dot-dash line for simultaneous actuation by the control knob 66. The circuitry involved in Fig. 4 is best understood from a tracing of the wiring diagram shown therein supplemented by the following description thereof and with reference to the schematic diagrams illustrated in Figs. 5 through 7. It will be noted that the stator or output windings of the transmitter 67 are respectively connected to the rotary contacts of switches 60, 62 and 64. Similarly, the stator windings of the receiver 68 are connected respectively with the rotary contacts of the switches 61, 63 and 65. Lead 69, which connects with contacts 55a and 55g of switch 55 and to one end of the coil 53, may be considered as a common lead and connects with one fixed contact on switches 60 and 62 and with a plurality of contacts, five in number, of switch 61. Lead 70 is connected with one of the rotary contacts of switch 55 and lead 71 connects with the other rotary contact of switch 55. The value of inductance connected between lead 69, 70 will be equal to twice the inductance across the leads 69, 71, when the upper rotary control engages any of the contacts 55b through 55f. In a similar manner lead 72, which is connected with one end of coil 54 and with the contacts 56a and 56g of switch 56 may be considered as a common lead, while leads 73 and 74 are connected respectively with the two rotary contacts of switch 56 to provide values of inductance between leads 72, 73 and leads 72, 74, which are in the ratio of two to one.

A plurality of the fixed contacts of switch 60 illustrated as five in number are connected with lead 70, while lead 71 is connected with a single contact of switch 61 and a single contact of switch 63. A further plurality of five contacts of switch 60 is connected through resistor 75 to a corresponding number of contacts of switch 61. The remaining single contacts of switches 60 and 61 are connected respectively to leads 74 and 73. Lead 70 also connects with four of the contacts of switch 62.

The above indicates the manner in which coil 53 or fractional portions thereof, depending upon the setting of switch 55, are connected to various contacts of the direction controlling switches. In a similar manner, the coil 54 or pre-selected values thereof are also connected with the fixed contacts of these switches. For example, the common lead 72 connects with a single contact on switch 62, a single contact on switch 65, and with six contacts on switch 64. Lead 74, in addition to connecting with a single contact on switch 60, connects with single contacts on switches 63, 64 and 65, while lead 73 connects with single contacts on switches 61, 62 and 63 and with five contacts on switch 65. A plurality of five contacts on switch 62 connect through resistor 76 with five correspondingly positioned contacts on switch 63, and a plurality of five fixed contacts on switch 64 to connect through resistor 77 to five correspondingly positioned contacts on switch 65.

Resistors 75, 76 and 77 are preferably all equal values, while for the various positions of the rotary contacts of switch 55 and 56 in engagement with the contacts bearing the letter suffixes "b" through "f," equal values of inductance will be supplied across the leads 69, 71 and 72, 74 and equal values across the leads 69, 70 and 72, 73.

The correction system shown in Fig. 4 will be best understood from the following description of its operation. Assume that the switches 60 through 65 occupy the positions shown in Fig. 4 and that the correct values of inductance are tapped off coils 53 and 54 by a proper setting of switches 55 and 56, the circuit established thereby will be as shown in Fig. 5. In this figure winding 671 of transmitter 67 will be connected through a selected value of inductance $$\left(\frac{L}{2}\right)$$

with winding 681 of receiver 68. Winding 672 of the transmitter will be connected with the corresponding winding 682 of the receiver through an inductance of the value (L). The remaining leg or winding 673 of the transmitter will be connected through resistance (R) to the corresponding winding 683 of the receiver. A tracing of the wiring diagram of Fig. 4 will show that the circuit of Fig. 5 will result provided the switches 55 and 56 are moved to positions providing values of inductance for correction purposes. In the position of switches 55 and 56 illustrated in Fig. 4, no correction will be effected, since zero values of inductance are provided thereby.

Now, assume the switches 60 through 65 are actuated to engage the switch contacts indicated at 60a, 61a, 62a, 63a, 64a, and 65a. Then the circuit of Fig. 6 will result. Resistances of the value (R) will be connected between the windings 671 and 681 of the transmitter and receiver and between the windings 672 and 682 thereof. Inductance of the value (L) will be connected between the winding 673 of the transmitter and the winding 683 of the receiver. Hence, it will be seen that the direction of correction provided by the circuit of Fig. 6 will be different from that provided by the circuit of Fig. 5 and, as a matter of fact, the direction of the correction provided by the arrangement in Fig. 6 will be rotated 75° from the direction provided by the circuit of Fig. 5. It will be understood that for positions of the switches 60 through 65 intermediate those providing the circuits shown in Figs. 5 and 6, smaller changes in the impedances in the various legs of the transmission system will be provided.

In Fig. 7, we have shown the circuit resulting from a positioning of the switch arms of switches 60 through 65 in contact with contacts 60b, 61b, 62b, 63b, 64b and 65b. Again, it will be seen that in Fig. 7 the values of impedance in the various legs of the circuit differ from those illustrated in Figs. 5 and 6. In Fig. 7, an inductance of the value (L) is connected between the windings 671 and 681 of the transmitter and receiver, a resistance of the value (R) is connected between the windings 672 and 682 thereof, while an inductance of the values $$\left(\frac{L}{2}\right)$$

is connected between the windings 673 and 683 of the transmitter and receiver. With the switches 60 through 65 in the position providing the circuit of Fig. 7, the direction of correction will be shifted 45° with respect to the direction of correction provided by the circuit of Fig. 6 and 120° with respect to the direction of correction provided by the circuit of Fig. 5. For all contact positions intermediate those specifically illustrated in Figs. 5 through 7, smaller incremental changes in the impedance values in the various legs of the circuits will be effected when the switches are rotated from one contact position to another and a movement of the rotary contacts from one fixed contact to the next adjacent contact will effect a change in the direction of correction of 15°.

It will be understood that the circuit of Fig. 4 serves in an exemplary manner to illustrate one form of our invention and that it may be rearranged to permit an operator to select desired values of impedance, that is, resistance and/or inductance and/or capacitive reactance, as the case may be, and to vary the values of impedance in smaller or larger incremental steps and that the direction of the correction may be varied in smaller or larger angular increments depending upon the desired accuracy of the system. Moreover, it will be noted that with the arrangements shown in Fig. 4, the correction device itself comprises two control knobs, the knob 59 being employed to control the magnitude of the correction and the knob 66 being employed to control the direction of the correction throughout 180°.

Furthermore, it will be noted that in all of the embodiments of our invention herein illustrated and described, the correction device may be positioned remote from the transmitter and receiver and for example in a fairly accessible place where it may be manually adjusted to effect the desired correction in the data transmission system.

While we have described our invention in its preferred embodiments, it is to be understood that the words which we have used are words of description rather than of limitation and that changes within the purview of the appended claims may be made without departing from the true scope and spirit of our invention in its broader aspects.

What is claimed is:

1. In a data transmission system comprising a transmitter, a receiver, and a connecting circuit connected in multi-circuit fashion between said transmitter and receiver, the combination of means to compensate for double-cycle error inherent in such system, said last-recited means comprising variable impedance means connected in series circuit with the legs of said connecting circuit, and a first switching means for simultaneously varying the values of certain of said impedance means in predetermined increments, and a second switching means for simultaneously varying the relative connections of said impedance means.

2. In a data transmission system comprising a transmitter, a receiver, and a connecting circuit connected in multi-circuit fashion between said transmitter and receiver, the combination of means to compensate for double-cycle error inherent in such system, said last-recited means comprising impedance means including inductance and resistance adapted to be connected in the legs of said connecting circuit, a first switching means to vary the value of said inductance to change the magnitude of the double-cycle error, and a second switching means for selectively connecting any of said values of inductance or said resistance in series in respective legs of said connecting circuit to change the direction of the double-cycle error.

3. In a data transmission system comprising a transmitter, a receiver, and a connecting circuit connected in multi-circuit fashion between said transmitter and receiver, the combination of means to compensate for double-cycle error inherent in such system, said last-recited means comprising a variable impedance means, a first switching means for obtaining any of a plurality of values of impedance from said impedance means thereby to change the magnitude of the double-cycle error, and a second switching means for selectively connecting said impedance values in series in respective legs of said connecting circuit thereby to change the direction of the double-cycle error.

4. In a data transmission system comprising a transmitter, a receiver, and a connecting circuit connected in multi-circuit fashion between said transmitter and receiver, the combination of means to compensate for double-cycle error inherent in such system, said last-recited means comprising impedance means including variable inductance means and resistance means, switching means for varying said inductance means to provide any of a plurality of values of inductance thereby to change the magnitude of the double-cycle error, and a plurality of ganged multi-contact switching means for selectively connecting predetermined combinations of said values of inductance and said resistance means in series circuit in respective legs of said connecting circuit thereby to change the direction of the double-cycle error.

5. In a data transmission system comprising a transmitter, a receiver, and a connecting circuit connected in multi-circuit fashion between said transmitter and receiver, the combination of means to compensate for double-cycle error inherent in such system, said last-recited means comprising a tapped inductance, switch means connected with the taps of said inductance for selecting any of a plurality of values of inductance to change the magnitude of the double-cycle error, and a second switching means for selectively connecting said selected values of inductance in series circuit with any of the various legs of said connecting circuit to change the direction of the double-cycle error.

6. A device adapted to be connected in multi-circuit fashion with the legs of a connecting circuit between the transmitter and receiver of a data transmission system for compensating for double-cycle error in said system, said device comprising a plurality of impedances adapted to be connected in circuit with the legs of said connecting circuit, manually operable means for selecting portions of said impedances having predetermined impedance values to be respectively connected in circuit with the legs of said connecting circuit for the purpose of compensating for the magnitude of the double-cycle error, multi-position switch means for connecting the selected portions of said impedance means in series circuit in the respective legs of said connecting circuit, said switch means being arranged upon successive operations thereof cyclically to transfer said selected impedance portions from one leg to another of said connecting circuit whereby the selected impedance values may be so connected in the legs of said connecting circuit as to compensate for the direction of said double-cycle error.

7. A device adapted to be connected in multi-circuit fashion with the legs of a connecting circuit between the transmitter and receiver of a data transmission system and remotely positioned from said transmitter and receiver for compensating for double-cycle error in said system, said device comprising a plurality of tapped inductances adapted to be connected in circuit with the legs of said connecting circuit, a manually operable switch means having contacts thereof respectively connected with the taps of said inductances for selecting portions of said inductances having predetermined values to be respectively connected in circuit with the legs of said connecting circuit for the purpose of compensating for the magnitude of the double-cycle error, a manually operable, multi-position switch means for connecting the selected portions of said inductances in series circuit in the respective legs of said connecting circuit, said multi-position switch means being arranged cyclically to transfer the inductance portions so selected from one leg to another of said connecting circuit whereby the selected inductance portions may be so connected in the legs of said connecting circuit as to compensate for the direction of said double-cycle error.

References Cited in the file of this patent

UNITED STATES PATENTS

| | | |
|---|---|---|
| 2,439,414 | Agins | Apr. 13, 1948 |
| 2,482,020 | Meagher et al. | Sept. 13, 1949 |
| 2,515,495 | Curry | July 18, 1950 |
| 2,544,710 | McCarthy | Mar. 13, 1951 |
| 2,581,436 | McCarthy | Jan. 8, 1952 |
| 2,619,526 | Willman | Nov. 25, 1952 |
| 2,651,010 | Wendt | Sept. 1, 1953 |

FOREIGN PATENTS

| | | |
|---|---|---|
| 351,891 | Great Britain | July 2, 1931 |
| 487,226 | Great Britain | June 17, 1938 |